Figure 1:
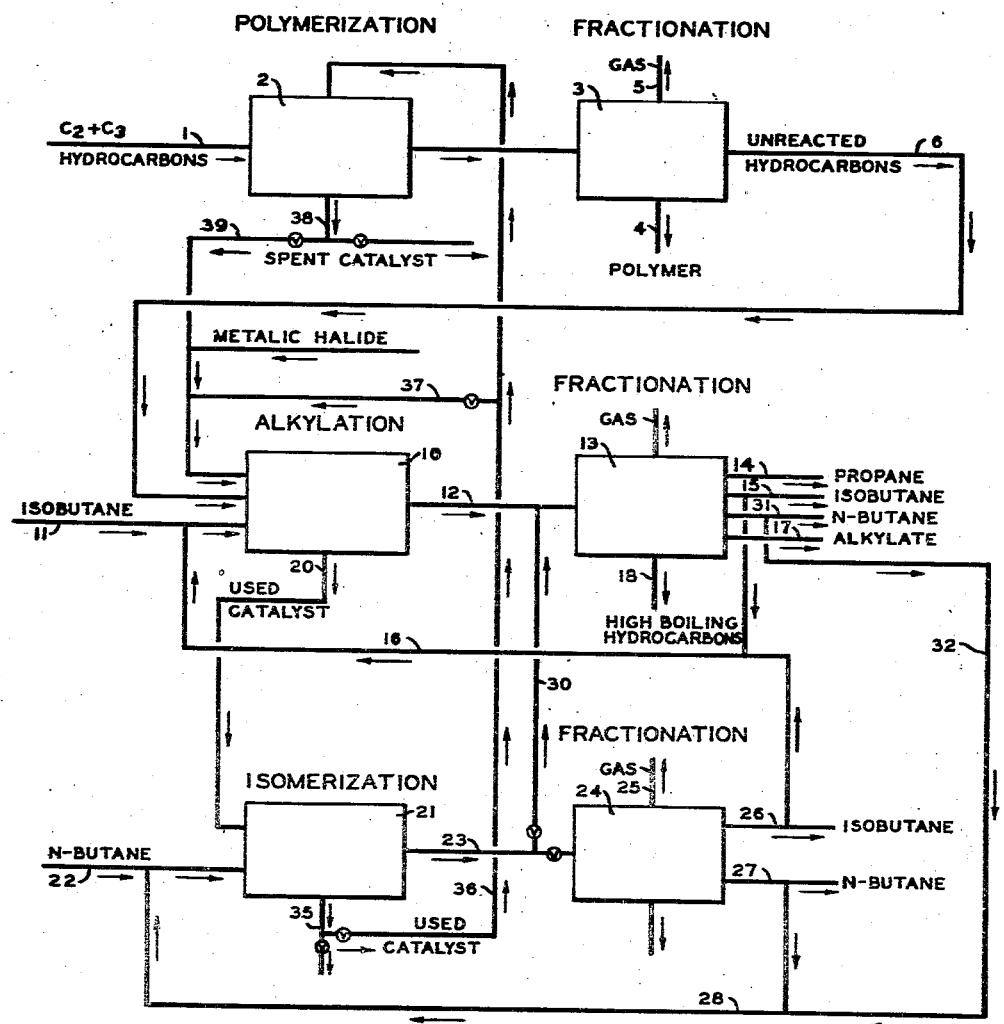

June 11, 1946.  L. A. CLARKE  2,401,859

MANUFACTURE OF GASOLINE HYDROCARBONS

Filed April 24, 1942

Louis A. Clarke
INVENTOR

BY R. J. Dearborn

HIS ATTORNEY

Patented June 11, 1946

2,401,859

UNITED STATES PATENT OFFICE 2,401,859

MANUFACTURE OF GASOLINE HYDROCARBONS

Louis A. Clarke, Beacon, N. Y., assignor to The Texas Company, New York, N. Y., a corporation of Delaware Application April 24, 1942, Serial No. 440,281

4 Claims. (Cl. 260—683.4)

This invention relates to the manufacture of gasoline hydrocarbons by the catalytic conversion of feed hydrocarbons involving mainly reactions of alkylation and isomerization.

Broadly the invention has to do with reacting olefin and isoparaffin hydrocarbons in the presence of an active metallic halide catalyst under conditions effective to produce alkylated hydrocarbons, and also isomerizing hydrocarbons by the action of metallic halide-hydrocarbon complex liquid obtained from the alkylation reaction. Advantageously the isomerization reaction is utilized to produce isoparaffin hydrocarbon for use in the alkylation reaction to react with olefins therein so as to form valuable gasoline hydrocarbons.

Metallic halide hydrocarbon complex used in catalyzing the isomerization reaction, or which has become spent or substantially spent in catalyzing the isomerization reaction is advantageously returned at least in part to the alkylation reaction. It may be used also in effecting a preliminary treatment of feed hydrocarbons passing to the process, particularly the hydrocarbons passing to the alkylation reaction.

The invention has particular application in the alkylation of ethylene or an olefinic feed containing a relatively large amount of ethylene with a low boiling isoparaffin such as isobutane by the action of an aluminum halide catalyst, for example, aluminum chloride in the presence of hydrogen chloride or other suitable promoter.

As disclosed in my pending application, Serial No. 327,575, filed April 3, 1940, for Alkylation of hydrocarbons, an effective method for alkylating ethylene and isobutane consists in subjecting the reactant hydrocarbons in the presence of hydrogen chloride to the action of a catalyst comprising a body of aluminum chloride-hydrocarbon complex liquid containing active aluminum chloride dispersed or suspended therein in solid form and maintained under alkylating conditions.

The present invention involves withdrawing complex liquid from the alkylation reaction and using it as a catalyst in the presence of hydrogen chloride for isomerizing straight chain hydrocarbons or hydrocarbons of moderately branched chain character to form high branched chain hydrocarbons. Thus, in accordance with the invention a straight chain or moderately branched chain hydrocarbon may be converted into highly branched chain hydrocarbons having the same number of carbon atoms per molecule.

It now appears that the aluminum chloride-hydrocarbon complex liquid which has become substantially completely spent as an alkylation catalyst is still effective as an isomerization catalyst for converting normal butane to isobutane, for example.

Moreover, the complex which has become spent in the isomerization reaction may be added with advantage to the alkylation reaction in small amounts either intermittently or continuously. The addition of this spent complex from the isomerization reaction imparts a beneficial thinning effect upon the complex in the alkylation reaction. Conditions prevailing in the alkylation reaction where olefins are present are such that the catalyst is subject to substantial deterioration which is accompanied by a thickening of the complex so that it loses fluidity and also becomes less effective as a component of the catalyst in the alkylation reaction. Addition of used complex obtained from the isomerization reaction actually reduces the viscosity and increases the fluidity of the alkylation catalyst mixture.

According to one modification of the invention a portion of the catalyst complex which has become substantially ineffective as an alkylation catalyst or which has become ineffective in the isomerization reaction may be employed as a preliminary treating agent for the feed to the alkylation process. This preliminary treatment is advantageous in the event that the ethylene feed to the alkylation reaction contains substantial amounts of $C_3$ and higher olefins since it is usually desirable to remove these higher olefins in the alkylation of ethylene.

This preliminary treatment is advantageously effected under polymerizing conditions such that the $C_3$ olefin is converted to polymer liquid, the resulting polymer liquid may be removed and disposed of as blending stock or may be subjected to other types of processes, for example, the propylene polymer may be passed to a separate alkylation reaction wherein $C_3$ and higher olefins are alkylated with isoparaffin.

The aluminum chloride-hydrocarbon complex after removal from this polymerizing treatment may be removed from the system or may be passed all or in part to the alkylation reaction for the purpose of diluting the catalyst complex as previously mentioned.

Although reference has been made above to employing in the isomerization reaction complex which has been substantially completely spent as an alkylation catalyst, nevertheless it is contemplated that incompletely spent complex may be used to advantage. Depending upon the particular operating technique employed, the complex drawn off from the alkylation reaction may or may not be completely spent. It may be only partially spent and in such case this used complex may be passed to the isomerization reaction.

Likewise the used catalyst discharged from the isomerization reaction may or may not be completely spent, although complex which has become substantially completely spent in the isomerization reaction is preferred in effecting removal of propylene by selective polymerization from the feed to the alkylation reaction. It is also the desired type of material to use in thinning out the alkylation catalyst.

In any case the catalyst discharged from the isomerization unit should at least be relatively free of aluminum halide over and above that chemically combined as the complex.

The following results afford a comparison of the effectiveness, as an alkylation catalyst, for alkylating ethylene with isobutane of (1) powdered aluminum chloride suspended in the reacting hydrocarbons; (2) powdered aluminum chloride suspended in a preformed aluminum chloride-kerosene complex; and (3) preformed aluminum chloride-kerosene complex without the addition of powdered aluminum chloride and substantially free of aluminum chloride over and above that chemically combined as complex.

In each case, a batch of catalyst was charged to a reactor and the feed hydrocarbons charged continuously to the reactor over a period of time, the hydrocarbons being charged at the same rate in each experiment in the ratio of about 4.3 mols of isobutane to 1 mol of ethylene. The catalyst and hydrocarbons were subjected to agitation and maintained within the reactor at a temperature of about 110° F. Hydrocarbon reaction products were continuously withdrawn.

|  | Runs | | |
|---|---|---|---|
|  | 1 | 2 | 3 |
| Contact time in minutes | 18 | 10.6 | 11.6 |
| Total duration of run in minutes | 880 | 400 | 400 |
| Total volume of debutanized alkylate in gallons | 3.1 | 1.7 | 0.7 |
| Yield of debutanized alkylate by weight per cent of olefin charged | 180 | 237 | 96 |
| Volume per cent of debutanized alkylate boiling below 311° F | 97.6 | 97.7 | 96.6 |
| Bromine number of alkylate | 0 | 0 | 0 |
| CFRM octane of alkylate | 92.7 | 92.3 | 92.9 |

In run 1 a quantity of the powdered aluminum chloride was merely suspended in the reactant hydrocarbons within the reactor. In run 2 the catalyst comprised powdered aluminum chloride and preformed complex in the ratio of one gram of powdered aluminum chloride to 3 cc. of complex, and this catalyst mixture was added to the reactor so that the amount of powdered aluminum chloride maintained in the reactor was the same as in run 1. In run 3 the preformed complex was added to the reactor so that the amount of complex in the reactor was the same as that in run 2. In each run a small amount of hydrogen chloride was used to promote the reaction.

Comparing runs 1 and 2 it is observed that there is an increase in the yield of debutanized alkylate on the basis of the olefin charged from 180% to 237% by the use of the catalyst comprising powdered aluminum chloride suspended in complex rather than suspended in the reacting hydrocarbons. Moreover, it is observed that this higher yield is obtained in spite of the fact that shorter contact time was used in the run with the complex catalyst.

Run 3 shows that the liquid complex by itself is relatively ineffective in the alkylation reaction. Thus, the yield of debutanized alkylate amounted to only 96.6% by weight of the olefin charged as compared with 180% yield in run 1 and 237% yield in run 2.

Used aluminum chloride-hydrocarbon complex obtained from the alkylation of isobutane with ethylene and substantially similar in character to the complex remaining from run 2 above was employed as a catalyst for isomerizing normal pentane. In this experiment 500 parts of normal pentane, 75 parts of complex and about 7 parts of hydrogen chloride by weight were charged to a reactor. The charge was subjected to mixing while maintained at a temperature of about 160° F. and under a pressure of about 90 to 107 pounds per square inch gauge for a period of about 4 hours.

The hydrocarbon products of reaction were removed and found to have the following composition in per cent by weight:

Butane and lighter hydrocarbons _____ 37.7
Isopentane _____ 22.6
Normal pentane and heavier hydrocarbons__ 39.7

In still another experiment normal butane was isomerized by the action of a catalyst consisting of preformed aluminum chloride-kerosene complex. In this complex substantially all of the aluminum chloride was chemically combined with hydrocarbon. A stream of normal butane in liquid phase was passed continuously through a tower filled with the aluminum chloride-kerosene complex maintained at a temperature of about 212° F. The reaction was effected in the presence of hydrogen chloride which was introduced as a constituent of the normal butane charge to the extent of about 2 to 3% by weight of normal butane.

A stream of hydrocarbon products was continuously withdrawn from the tower. The withdrawn hydrocarbons comprised about 50% isobutane, the remainder consisting essentially of unreacted normal butane.

From the foregoing it is apparent that aluminum chloride-hydrocarbon complex which has been used as a catalyst in the alkylation reaction or which is substantially spent as a catalyst for the alkylation reaction still possesses substantial activity as a catalyst for the isomerization reaction.

In order to describe the invention further reference will now be made to the accompanying drawing illustrating diagrammatically the method of practicing the process of the invention, particularly as applied to the alkylation of ethylene with isobutane coupled with isomerization of normal butane to supply isobutane for the alkylation reaction.

Figure 2:
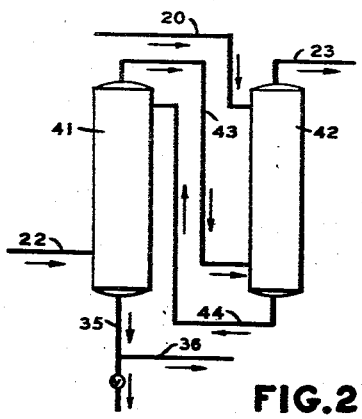

Fig. 1 illustrates a diagram of flow for the overall process including the polymerization, alkylation and isomerization stages, while Fig. 2 illustrates a specific method of flow for the isomerization stage.

As indicated in Fig. 1 of the drawing an olefinic feed mixture is drawn from a source not shown through a pipe 1. This olefinic feed may comprise a mixture of hydrocarbons having from 2 to 3 carbon atoms per molecule including ethylene, propylene and propane, although it is contemplated that the composition of the feed may vary depending upon its source.

In order to remove propylene from the ethylene feed to the process the feed is advantageously passed to a polymerization unit 2 wherein it is brought into contact with used aluminum chloride-hydrocarbon complex liquid, advantageously that obtained in a subsequent stage of the process. This contact is effected at temperature in the range of about 0 to 150° F. and under liquid phase conditions if desired such that the propylene is selectively polymerized to a liquid polymer. The reacted and unreacted hydrocarbons are passed from the unit 2 to a fractionation unit 3 wherein the polymer is removed from the unreacted hydrocarbon. Thus, the polymer may be discharged through a pipe 4. Also any fixed gases or other products in the polymerization reaction may be discharged through a pipe 5 while the unreacted hydrocarbons rich in ethylene are discharged through a pipe 6 leading to an alkylation unit 10.

The alkylation unit 10 may be similar to that disclosed in my above-mentioned pending application, Serial No. 327,575 and wherein the catalyst comprises a substantial liquid body of aluminum chloride-hydrocarbon complex having a substantial amount of powdered or granular aluminum chloride suspended or dispersed therein. For example, the complex may be that produced in the reaction or may comprise preformed complex such as aluminum chloride-kerosene or complex formed by reacting aluminum chloride with other hydrocarbons or alkyl chlorides. Advantageously powdered aluminum chloride is added to the complex to maintain the activity of the catalyst, for example, in an amount which may range from about 2 to 50% by weight of the complex liquid. About equal volumes of catalyst and reacting hydrocarbons may be maintained in the reaction zone, although this may be varied as desired.

Depending upon the character of the particular apparatus used the catalyst may be used in substantially batch form, being removed after a prolonged period of operation. On the other hand it is contemplated that make-up aluminum chloride may be continuously or intermittently added to the alkylation catalyst mixture while complex liquid is continuously or intermittently withdrawn therefrom. It is contemplated that all of the fresh aluminum chloride employed in the combined process is added to the alkylation unit.

Isobutane or other low boiling isoparaffin may be drawn from a source not shown through a pipe 11 and introduced to the alkylation reaction. Advantageously, the isobutane is added to the alkylation reaction so as to be in substantial molar excess over the olefin present in the reaction. Thus, the ratio of isobutane to ethylene may be in the range of about 2 to 10 mols of isobutane to 1 mol of ethylene.

The alkylation reaction is advantageously carried out at a temperature in the range about 100 to 130° F. and under a pressure of about 125 to 250 pounds gauge.

While not indicated in the drawing, hydrogen chloride or other promoter capable of liberating hydrogen chloride or hydrogen halide in the reaction is used. For example, the hydrogen chloride present in the reaction may amount to about 0.05 to 0.5% by weight of the total hydrocarbon feed.

The alkylated hydrocarbons are passed through a pipe 12 to a fractionation unit 13 wherein the fractionation may be operated so as to separately remove gaseous constituents and normally gaseous hydrocarbons such as isobutane, normally liquid alkylated hydrocarbons and any higher boiling hydrocarbons. In the event that the olefin feed previously mentioned contains propane such propane will pass through the alkylation reaction without undergoing substantial change and will be withdrawn therefrom in the hydrocarbon reaction products. Consequently, the fractionation unit 13 may be operated so as to separate a light fraction rich in propane which can be discharged from the system at this point through a pipe 14.

Isobutane or a fraction rich in isobutane may be discharged through a pipe 15 and all or in part recycled through a pipe 16 leading to the alkylation unit 10. The alkylate is discharged through a pipe 17 while higher boiling hydrocarbons may be discharged through a pipe 18.

The catalyst complex which has been discharged from the alkylation operation is conducted through a pipe 20 to an isomerization unit 21 wherein it is employed as the catalyst for effecting isomerization of normal butane or other saturated hydrocarbons which are not already of highly branched chain character. Thus, normal butane conducted from a source not shown through a pipe 22 is passed to the isomerization unit. In such case the isomerization reaction is advantageously effected at a temperature in the range about 180 to 230° and preferably at about 200 to 210° F. in the presence of hydrogen chloride or other promoting material. The reaction is advantageously effected in the liquid phase as, for example, under a pressure in the range about 250 to 500 pounds.

The reacted and unreacted hydrocarbons are conducted through a pipe 23 to a fractionating unit 24 for the purpose of effecting separation between isobutane and normal butane as well as for effecting removal of constituents of either lower or higher molecular weight than butane which may have been formed in small amount in the isomerization reaction. Thus, gaseous constituents can be discharged through a pipe 25 while isobutane or a fraction rich in isobutane is discharged through a pipe 26 which may communicate with the previously mentioned pipe 16 providing a means for passing the isobutane to the previously described alkylation reaction.

Unreacted normal butane is discharged from the fractionating unit through a pipe 27 and may be recycled through a pipe 28 to the isomerization reaction.

If desired the fractionation of the hydrocarbon products of the isomerization reaction may be effected in the fractionation unit 13. In such case the hydrocarbon products may be conducted through a branch pipe 30 leading to the fractionating unit 13 wherein these products are fractionated along with the products of the alkylation reaction. In this type of operation the fractionation unit 13 advantageously includes provision for segregating normal butane which can be discharged through a pipe 31 and which may also communicate with a branch pipe 32 leading to the previously mentioned pipe 28 through which the normal butane all or in part may be recycled to the isomerization reaction.

The used catalyst complex is withdrawn from the isomerization unit through a pipe 35 and may be discharged from the system. Advantageously at least a portion thereof is conducted through a branch pipe 36 leading to the previously mentioned polymerization unit 2 or communicating with the previously mentioned alkylation unit 10 by means of another branch pipe 37.

As indicated in the drawing the aluminum chloride-hydrocarbon complex utilized in the polymerization unit 2 may be discharged therefrom through a pipe 38 and thus be removed entirely from the system at this point or may be conducted all or in part through a branch pipe 39 to the alkylation unit 10 wherein it is employed either to thin the catalyst mixture used in the alkylation reaction or to provide preformed complex liquid to serve as a carrier medium in which to suspend or disperse solid aluminum chloride.

Since the alkylation and isomerization reactions are usually carried out in the presence of hydrogen chloride the gaseous constituents removed from the hydrocarbon reaction products of the respective reactions will contain hydrogen chloride which may be recycled to the reactions. If the reactions are carried out in the presence of other agents such as hydrogen, for example, the effluent gases will likewise contain this material and therefore provision may be made for recycling it to the reactions.

The conversion reactions with the fluid catalyst may be carried out in conventional apparatus, for example, the apparatus may comprise agitated reactors or a plurality of such reactors with provision for effecting separation between the hydrocarbon and catalyst phases with return of the catalyst phase to the reaction.

Instead of employing agitated reactors it is contemplated that the catalyst may be used as a relatively stationary mass of fluid through which the hydrocarbons undergoing conversion are caused to flow. For example, in the isomerization reaction the reactor may comprise a tower or other vertical vessel substantially completely filled with the liquid catalyst. The feed hydrocarbon heated at approximately the conversion temperature is introduced to the lower portion of the chamber or tower and caused to flow upwardly through the relatively stationary mass of catalyst liquid by difference in density. The hydrocarbon products accumulating in the upper portion of the vessel or tower are continuously withdrawn therefrom.

The catalytic conversion reactions may be carried out in either batch or continuous flow. Countercurrent contact between hydrocarbons and catalyst may be used.

The isomerization reaction, for example, may be carried out with a continuous countercurrent flow of hydrocarbon and catalyst as illustrated in Fig. 2. Thus, as shown in Fig. 2 the isomerization unit 2 of Fig. 1 may have two reaction towers 41 and 42. These towers may contain inert packing material such as Raschig rings. The used catalyst from the alkylation unit 10 of Fig. 1 is conducted through the pipe 20 to the upper portion of tower 42 wherein it flows downwardly through the tower countercurrently to a rising stream of hydrocarbon which is continuously introduced to the lower portion of the tower through a pipe 43. The converted hydrocarbons are discharged from the top of the tower 42 through the pipe 23 while the liquid catalyst is removed from the bottom of the tower through a pipe 44 and conducted to the top of the reaction tower 41 wherein it flows downwardly through the tower countercurrently to a rising stream of hydrocarbon introduced to the lower portion of the tower through the pipe 22.

The treated hydrocarbons rising to the top of the tower 41 are removed through the previously mentioned pipe 43 leading to the second tower 42. Used catalyst is drawn off from the bottom of the tower 41 through the pipe 35 through which it may be discharged from the system or conducted all or in part through the previously mentioned pipe 36 leading to the alkylation unit 10 or the polymerization unit 2.

While aluminum chloride has been specifically mentioned it is contemplated that other metallic halides such as aluminum bromide and zirconium chloride may be used. Likewise other hydrogen halide promoters besides hydrogen chloride may be used.

While isomerization of normal butane has been described it is also contemplated that the isomerization reaction may involve conversion of other hydrocarbons including straight chain paraffins as well as naphthene hydrocarbons and may also involve isomerization of naphtha particularly relatively low boiling fractions thereof. When naphtha or other hydrocarbons are subjected to isomerization to produce gasoline hydrocarbons of highly branched chain character the resulting isomerized hydrocarbons may be blended with the alkylated hydrocarbons for the production of motor fuel or other products.

Obviously many modifications and variations of the invention as above set forth may be made without departing from the spirit and scope thereof, and therefore only such limitations should be imposed as are indicated by the appended claims.

I claim:

1. In the manufacture of gasoline hydrocarbons by catalytic conversion of normally gaseous hydrocarbons including olefins and paraffins involving reactions of alkylation and isomerization separately effected by the action of a common aluminum halide catalyst, the steps comprising obtaining an olefinic hydrocarbon fraction containing ethylene and some propylene, subjecting said fraction to contact with aluminum halide-hydrocarbon complex liquid in a preliminary treating zone under conditions so as to polymerize propylene, removing resulting polymer, passing the unreacted hydrocarbons to an alkylation zone, containing a catalyst comprising chemically uncombined aluminum halide dispersed in a liquid body of an aluminum halide-hydrocarbon complex maintained under alkylating conditions in the presence of hydrogen halide, passing isobutane to said reaction zone such that alkylated hydrocarbons in the gasoline boiling range are produced, removing alkylated hydrocarbons, withdrawing aluminum halide-hydrocarbon complex liquid from said alkylation reaction, said withdrawn complex being substantially ineffective as an alkylation catalyst, subjecting withdrawn complex liquid without regeneration to contact with normal butane under isomerizating conditions such that there is substantial conversion of said normal butane to isobutane, withdrawing isobutane so formed, passing withdrawn isobutane to said alkylation reaction, withdrawing aluminum halide-hydrocarbon complex liquid from said isomerization reaction, passing said withdrawn complex liquid to said preliminary treating zone to provide the sole polymerizing catalyst therein for effecting polymerization of propylene, withdrawing used complex from said treating zone, passing complex so withdrawn to the alkylation reaction, and maintaining the activity of said common catalyst by addition of fresh aluminum halide to the alkylation reaction.

2. In the manufacture of gasoline hydrocarbons by catalytic conversion of normally gaseous hydrocarbons including olefins and paraffins involving reactions of alkylation and isomerization separately effected by the action of a common aluminum halide catalyst, the steps comprising obtaining an olefinic hydrocarbon fraction containing ethylene and some propylene, subjecting said fraction to contact with aluminum halide-hydrocarbon complex liquid in a preliminary treating zone under conditions so as to polymerize propylene, removing resulting polymer, passing the unreacted hydrocarbons to an alkylation zone, containing a catalyst comprising chemically uncombined aluminum halide dispersed in a liquid body of an aluminum halide-hydrocarbon complex maintained under alkylating conditions in the presence of hydrogen halide, passing a low boiling isoparaffin hydrocarbon to said reaction zone such that alkylated hydrocarbons in the gasoline boiling range are produced, removing alkylated hydrocarbons, withdrawing aluminum halide-hydrocarbon complex liquid from said alkylation reaction, said withdrawn complex being substantially ineffective as an alkylation catalyst, subjecting withdrawn complex liquid without regeneration to contact with a low boiling isomerizable normal paraffin hydrocarbon under isomerizing conditions such that there is substantial conversion of said normal paraffin to isoparaffin, withdrawing isoparaffin so formed, passing withdrawn isoparaffin to said alkylation reaction, withdrawing aluminum halide-hydrocarbon complex liquid from said isomerization reaction, passing said withdrawn complex liquid to said preliminary treating zone to provide the sole polymerizing catalyst therein for effecting polymerization of propylene, withdrawing used complex from said treating zone, passing complex so withdrawn to the alkylation reaction, and maintaining the activity of said common catalyst by addition of fresh aluminum halide to the alkylation reaction.

3. In the manufacture of gasoline hydrocarbons by catalytic conversion of normally gaseous hydrocarbons including olefins and paraffins involving reactions of alkylation and isomerization separately effected by the action of a common aluminum halide catalyst, the steps comprising obtaining an olefinic hydrocarbon fraction containing ethylene and some higher molecular weight normally gaseous olefins, subjecting said fraction to contact with aluminum halide-hydrocarbon complex liquid in a preliminary treating zone under conditions so as to polymerize higher molecular weight olefins, removing resulting polymer, passing the unreacted hydrocarbons to an alkylation zone, containing a catalyst comprising chemically uncombined aluminum halide dispersed in a liquid body of an aluminum halide-hydrocarbon complex maintained under alkylating conditions in the presence of hydrogen halide, passing isobutane to said reaction zone such that alkylated hydrocarbons in the gasoline boiling range are produced, removing alkylated hydrocarbons, withdrawing aluminum halide-hydrocarbon complex liquid from said alkylation reaction, said withdrawn complex being substantially ineffective as an alkylation catalyst, subjecting withdrawn complex liquid without regeneration to contact with normal butane under isomerizing conditions such that there is substantial conversion of said normal butane to isobutane, withdrawing isobutane so formed, passing withdrawn isobutane to said alkylation reaction, withdrawing aluminum halide-hydrocarbon complex liquid from said isomerization reaction, passing withdrawn complex liquid to said preliminary treating zone to provide the sole polymerizing catalyst therein for effecting polymerization of higher molecular weight olefins, withdrawing used complex from said treating zone, passing complex so withdrawn to the alkylation reaction, and maintaining the activity of said common catalyst by addition of fresh aluminum halide to the alkylation reaction.

4. In the manufacture of gasoline hydrocarbons by catalytic conversion of normally gaseous hydrocarbons including olefins and paraffins involving reactions of alkylation and isomerization separately effected by the action of of a common aluminum halide catalyst, the steps comprising obtaining an olefinic hydrocarbon fraction containing ethylene and some higher molecular weight normally gaseous olefins, subjecting said fraction to contact with aluminum halide-hydrocarbon complex liquid in a preliminary treating zone under conditions so as to polymerize higher molecular weight olefins, removing resulting polymer, passing the unreacted hydrocarbons to an alkylation zone, containing a catalyst comprising chemically uncombined aluminum halide dispersed in a liquid body of an aluminum halide-hydrocarbon complex maintained under alkylating conditions in the presence of hydrogen halide, passing a low boiling isoparaffin hydrocarbon to said reaction zone such that alkylated hydrocarbons in the gasoline boiling range are produced, removing alkylated hydrocarbons, withdrawing aluminum halide-hydrocarbon complex liquid from said alkylation reaction, said withdrawn complex being substantially ineffective as an alkylation catalyst, subjecting withdrawn complex liquid without regeneration to contact with a low boiling isomerizable normal paraffin under isomerizing conditions such that there is substantial conversion of said normal paraffin to isoparaffin, withdrawing isoparaffin so formed, passing withdrawn isoparaffin to said alkylation reaction, withdrawing aluminum halide-hydrocarbon complex liquid from said isomerization reaction, passing said withdrawn complex liquid to said preliminary treating zone to provide the sole polymerizing catalyst therein for effecting polymerization of high molecular weight olefins, withdrawing used complex from said treating zone, passing complex so withdrawn to the alkylation reaction, and maintaining the activity of said common catalyst by addition of fresh aluminum halide to the alkylation reaction.

LOUIS A. CLARKE.